(12) United States Patent
Seo et al.

(10) Patent No.: US 10,493,980 B2
(45) Date of Patent: Dec. 3, 2019

(54) APPARATUS FOR CONTROLLING AUTOMATIC PARKING OF VEHICLE, SYSTEM HAVING THE SAME, AND METHOD THEREOF

(71) Applicant: Hyundai Motor Company, Seoul (KR)

(72) Inventors: Gil Won Seo, Hwaseong-si (KR); Chan Hee Jung, Anyang-si (KR); Joo Woong Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 15/495,617

(22) Filed: Apr. 24, 2017

(65) Prior Publication Data

US 2018/0162385 A1 Jun. 14, 2018

(30) Foreign Application Priority Data

Dec. 14, 2016 (KR) .................. 10-2016-0170222

(51) Int. Cl.
*B60W 30/06* (2006.01)

(52) U.S. Cl.
CPC ......... *B60W 30/06* (2013.01); *B60W 2420/42* (2013.01); *B60W 2420/54* (2013.01); *B60W 2422/00* (2013.01); *B60W 2520/06* (2013.01); *B60W 2550/10* (2013.01); *B60W 2550/14* (2013.01); *B60W 2550/20* (2013.01); *B60W 2550/402* (2013.01)

(58) Field of Classification Search
CPC .. B60W 30/06; B60W 10/06; B60W 2420/42; B60W 2420/54; B60W 2520/06; B62D 15/0285; B62D 15/027; G08G 1/168
See application file for complete search history.

(56) References Cited

U.S. PATENT DOCUMENTS

| | | | |
|---|---|---|---|
| 6,711,473 B2 | 3/2004 | Shimazaki et al. | |
| 7,643,935 B2 | 1/2010 | Sakakibara et al. | |
| 8,818,668 B2* | 8/2014 | Ikeda | B60W 10/06 701/1 |
| 9,283,960 B1* | 3/2016 | Lavoie | B60W 10/18 |
| 9,522,675 B1* | 12/2016 | You | B60W 30/06 |
| 9,581,997 B1* | 2/2017 | Penilla | G05D 1/0011 |

(Continued)

FOREIGN PATENT DOCUMENTS

| | | |
|---|---|---|
| JP | 2003-2142 A | 1/2003 |
| JP | 2015-214221 A | 12/2015 |
| KR | 10-1094153 B1 | 12/2011 |

*Primary Examiner* — Hunter B Lonsberry
*Assistant Examiner* — Luis A Martinez Borrero
(74) *Attorney, Agent, or Firm* — Morgan, Lewis & Bockius LLP

(57) ABSTRACT

An apparatus for controlling automatic parking of a vehicle, a system having the same, and a method thereof are provided, wherein the system for controlling the automatic parking of the vehicle may include a sensor device which scans for a parking space and acquires detected road width information, when entrance to a parking mode is made, and a vehicle automatic parking control device which receives road width information and congestion information relating to the parking space from a navigation device and determines a vehicle speed of a subject vehicle for parking assist by using the road width information, the congestion information, and the detected road width information.

20 Claims, 14 Drawing Sheets

(56) References Cited

U.S. PATENT DOCUMENTS

| | | | |
|---|---|---|---|
| 9,731,764 B2* | 8/2017 | Baek | B60W 30/06 |
| 9,792,820 B1* | 10/2017 | Russell, Jr. | H04R 1/028 |
| 10,240,933 B2* | 3/2019 | Grinenval | B62D 15/025 |
| 2002/0198634 A1 | 12/2002 | Shimazaki et al. | |
| 2008/0136673 A1* | 6/2008 | Jung | B62D 15/0285 |
| | | | 340/932.2 |
| 2008/0154464 A1* | 6/2008 | Sasajima | B62D 15/0285 |
| | | | 701/42 |
| 2014/0317498 A1* | 10/2014 | Okumura | G06F 3/016 |
| | | | 715/702 |
| 2014/0320432 A1* | 10/2014 | Muramatsu | G06F 3/016 |
| | | | 345/173 |
| 2015/0039173 A1* | 2/2015 | Beaurepaire | B60W 30/06 |
| | | | 701/23 |
| 2015/0151789 A1* | 6/2015 | Lee | B62D 15/0285 |
| | | | 701/41 |
| 2016/0159397 A1* | 6/2016 | Baek | B60W 30/06 |
| | | | 701/41 |
| 2016/0318510 A1* | 11/2016 | Hess | B60W 30/06 |
| 2017/0148325 A1* | 5/2017 | Schoenherr | G08G 1/096725 |
| 2017/0355307 A1* | 12/2017 | Ha | G08G 1/143 |
| 2018/0075744 A1* | 3/2018 | Seo | G08G 1/146 |
| 2018/0093662 A1* | 4/2018 | Kim | B60K 35/00 |
| 2018/0093663 A1* | 4/2018 | Kim | G08G 1/165 |
| 2018/0093664 A1* | 4/2018 | Kim | B62D 15/0285 |
| 2018/0099661 A1* | 4/2018 | Bae | G06K 9/00818 |
| 2018/0105167 A1* | 4/2018 | Kim | B60W 30/06 |
| 2018/0105208 A1* | 4/2018 | Kim | B62D 15/0285 |
| 2018/0186365 A1* | 7/2018 | Kim | G06K 9/00812 |
| 2018/0186407 A1* | 7/2018 | Kim | G06K 9/00812 |
| 2018/0339701 A1* | 11/2018 | Kwon | B60W 30/06 |
| 2019/0009773 A1* | 1/2019 | Miyahara | B60W 30/06 |

\* cited by examiner

SENSING AT 120 CM

STARTING OF BRAKING AFTER SENSING AT 120 CM

STOPPING AT 70 CM AFTER MOVING
BY BRAKING DISTANCE OF 50 CM

FAILURE IN SENSING AT 121 CM

SENSING AT 79 CM (121-42)
AFTER MOVING DURING ONE SAMPLE

STOPPING AT 29 CM AFTER MOVING
BY BRAKING DISTANCE OF 50 CM

FAILURE IN SENSING AT 121 CM

SENSING AT 91 CM (121-30)
AFTER MOVING DURING ONE SAMPLE

STOPPING AT 41 CM AFTER MOVING
BY BRAKING DISTANCE OF 50 CM

APPARATUS FOR CONTROLLING AUTOMATIC PARKING OF VEHICLE, SYSTEM HAVING THE SAME, AND METHOD THEREOF

CROSS-REFERENCE(S) TO RELATED APPLICATIONS

The present application claims priority to Korean Patent Application No. 10-2016-0170222, filed on Dec. 14, 2016, the entire contents of which is incorporated herein in for all purposes by this reference.

BACKGROUND OF THE INVENTION

Field of the Invention

The present invention relates to an apparatus for controlling automatic parking of a vehicle, a system having the same, and a method thereof. More particularly, to a technology of controlling automatic parking based on navigation information.

Description of Related Art

A current automatic parking system is a system which assists parking by scanning for a parking space through an ultrasonic sensor when a driver selects a parking mode (perpendicular parking (right or left), parallel parking (right or left), parallel parking out, and the like) or drives a vehicle at a constant speed to scan for a parking space. In addition, in the state that the driver gets in or gets out in the scanned parking space, the automatic parking system automatically controls steering, a vehicle speed, or gear shifting.

However, when the range of the ultrasonic sensor is restricted and a period of updating the distance is increased during the control of the steering, vehicle speed, or gear shifting for the parking control, the vehicle speed may be restricted and thus the total time required may be significantly increased until the parking is completed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for controlling automatic parking of a vehicle, which is configured for controlling a sensor mode and an operating sensor during parking control by utilizing information on a passage through a parking lot and information on a congestion degree in the parking lot, which are acquired from a navigation device, minimizing power consumption while rapidly and safely performing the automatic parking control, a system having the same, and a method thereof.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a system for controlling automatic parking of a vehicle may include a sensor device configured to scan for a parking space and acquires detected road width information, when an entrance to a parking mode is made, a vehicle automatic parking control device is configured to receive road width information and congestion information relating to the parking space from a navigation device and determines a vehicle speed of a subject vehicle for parking assist by using the road width information, the congestion information, and the detected road width information.

According to an embodiment, the sensor device may include at least a plurality of ultrasonic sensors, a plurality of cameras, or a plurality of scanners.

According to an embodiment, the sensor device may include a plurality of sensors arranged at a front portion, a rear portion, and opposite side portions of the vehicle.

According to an embodiment, the vehicle automatic parking control device may include an information collection device configured to collect the detected road width information, the road width information, and the congestion information, a parking space determination device configured to determine, by using the detected road width information and the road width information, whether a turning radius for parking is sufficient, and determines a congestion degree relating to the parking space by using the congestion information; and a vehicle speed determination device configured to determine a vehicle speed for the parking based on the turning radius for the parking and the congestion degree relating to the parking space.

According to an embodiment, the system may further include a parking assist device configured to perform the parking assist based on the vehicle speed determined by the vehicle speed determination device.

According to an embodiment, the vehicle speed determination device may determine a first vehicle speed by activating a first group including a minimum number of sensors selected among the sensors, when the road width information and the detected road width information are equal to or greater than a reference value, and when the congestion degree is low.

According to an embodiment, the vehicle speed determination device may determine the vehicle speed as the first vehicle speed which is a maximum speed.

According to an embodiment, the vehicle speed determination device may determine a second vehicle speed by activating a second group of sensors, which are more numerous than the sensors of the first group and are selected among the sensors for parking assist, when at least one of the road width information and the detected road width information is lower than the reference value, and when the congestion degree is low.

According to an embodiment, the vehicle speed determination device may determine a third vehicle speed by activating a third, all inclusive, group of sensors for parking assist when the congestion degree is high.

According to an embodiment, the second vehicle speed may be slower than the first vehicle speed, and the third vehicle speed may be slower than the second vehicle speed.

According to another aspect of the present invention, an apparatus for controlling the automatic parking of a vehicle may include an information collection device configured to collect detected road width information relating to a parking space from a sensor device, and collects road width information and congestion information relating to the parking space from a navigation device; a parking space determination device configured to determine, by using the detected road width information and the road width information, whether a turning radius for the parking is sufficient and determines a congestion degree relating to the parking space by using the congestion information; a vehicle speed determination device configured to determine a vehicle speed for parking based on the turning radius for parking and the congestion degree relating to the parking space; and a parking assist device configured to perform parking assistance based on the vehicle speed determined by the vehicle speed determination device.

According to another aspect of the present invention, a method of controlling automatic parking may include scanning for a parking space and acquiring detected road width information. When the entrance to a parking mode is executed, acquiring road width information and congestion information relating to the parking space from map data, and determining a vehicle speed of a subject vehicle for parking assist by using the road width information and the congestion information which are acquired from the map data, and the detected road width information.

According to an exemplary embodiment of the present invention, determining of the vehicle speed of the subject vehicle may include determining whether turning for the parking is possible by using the road width information, which is acquired from the map data, and the detected road width information, and determining a congestion degree relating to the parking space using the congestion information.

According to an exemplary embodiment, determining the vehicle speed of the subject vehicle, a first vehicle speed may be determined by activating a first group which includes a minimum number of sensors selected among a plurality of sensors for the parking assist, when the road width information and the detected road width information are equal to or greater than a reference value, and when a congestion degree is low.

According to an embodiment, in the determination of the vehicle speed of a subject vehicle, the vehicle speed may be determined as the first vehicle speed which is a maximum vehicle speed.

According to an embodiment, when determining the vehicle speed of the subject vehicle, a second vehicle speed may be determined by activating a second group of sensors, which are more numerous than the sensors of the first group and are selected among the sensors, including the first group, for parking assist when at least one of the road width information and the detected road width information is lower than the reference value, and when the congestion degree is low.

According to an embodiment, when determining the vehicle speed of the subject vehicle, a third vehicle speed may be determined by activating a third group including the entire selection of sensors for parking assist, when the congestion degree is high.

According to an embodiment, the second vehicle speed may be slower than the first vehicle speed, and the third vehicle speed may be slower than the second vehicle speed.

According to an embodiment, the method may further include assisting parking based on the determined vehicle speed.

According to an embodiment, in the acquiring of the road width information and the congestion information relating to the parking space from the map data, the road width information and the congestion information may be received from a navigation device.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
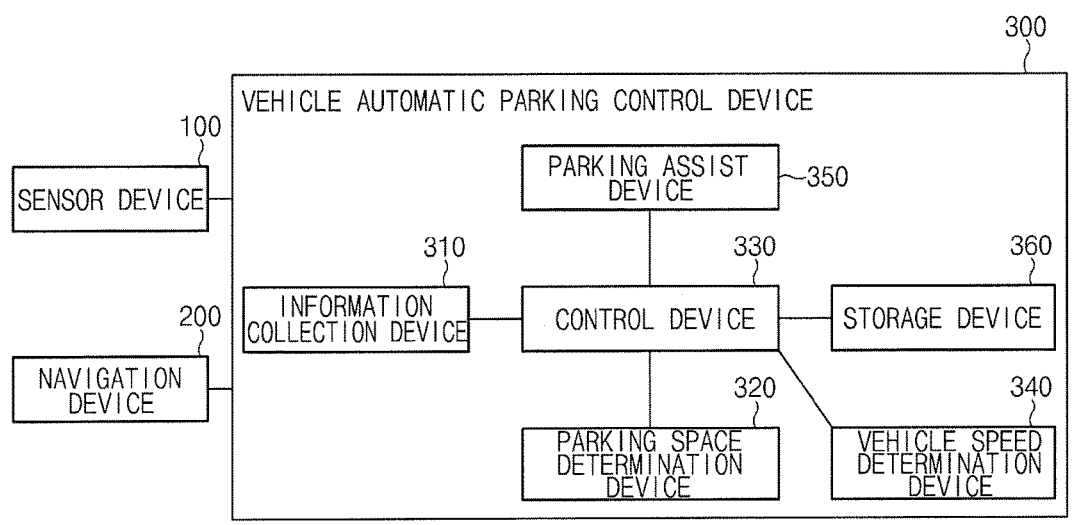
FIG. 1 is a block diagram illustrating a system for controlling automatic parking of a vehicle, according to an exemplary embodiment of the present invention.

It should be understood that the appended drawings are not necessarily to scale presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to FIG. 1 to FIG. 8.

FIG. 1 is a block diagram illustrating a system for controlling automatic parking of a vehicle, according to an exemplary embodiment of the present invention.

According to an exemplary embodiment of the present invention, the system for controlling the automatic parking of the vehicle includes a sensor device 100, a navigation device 200, and a vehicle automatic parking control device 300.

Figure 2A:
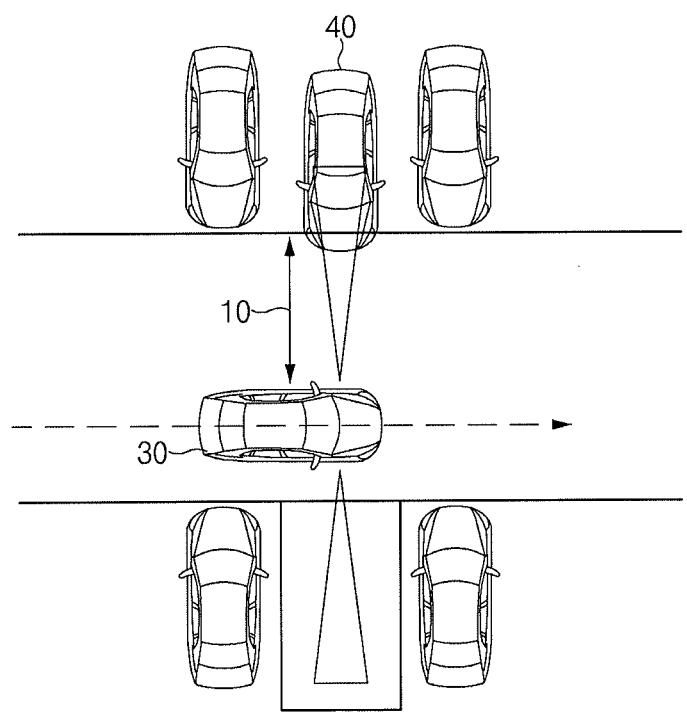
FIG. 2A is a view illustrating a road width by a sensor device, according to an exemplary embodiment of the present invention.

The sensor device 100 is configured to scan for a parking space and acquires detected road width information. In the present case, the sensor device 100 may include at least a plurality of sensors, a plurality of cameras, or a plurality of scanners, and may be disposed at a front portion, a rear portion, and opposite side portions of the vehicle. FIG. 2A is a view illustrating a road width by the sensor device 100 according to an exemplary embodiment of the present invention. Referring to FIG. 2A, the sensor device 100 detects a road width 10 which represents a distance from a subject vehicle to a surrounding vehicle which has been parked, acquiring the detected road width information.

Figure 2B:
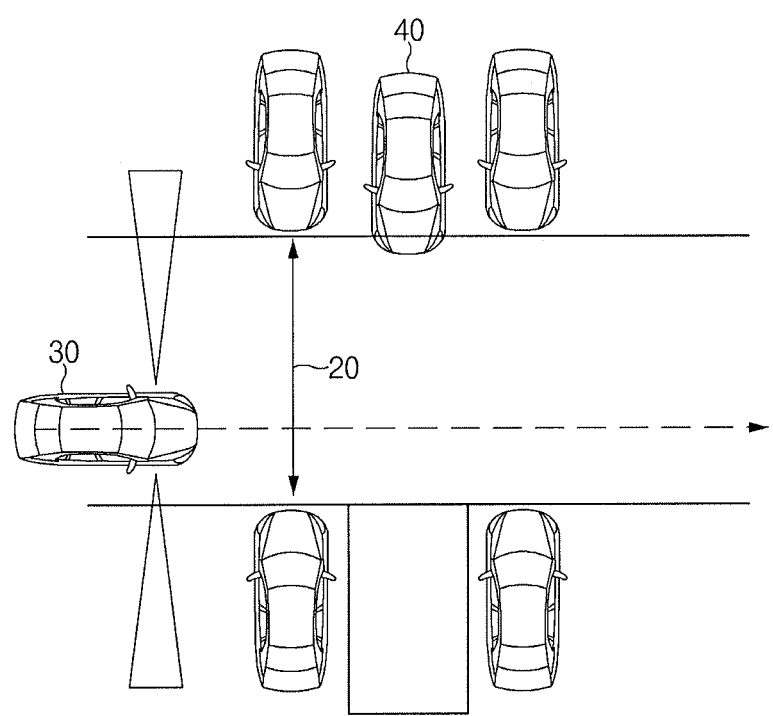
FIG. 2B is a view illustrating road width information received from a navigation device, according to an exemplary embodiment of the present invention.

The navigation device 200 is configured to provide road width information and congestion information on a passage relating to the parking space to the vehicle automatic parking control device 300. FIG. 2B is a view illustrating the road width information received from the navigation device 200 according to an exemplary embodiment of the present invention. As illustrated in FIG. 2B, the road width information represents information on a road width 20 of each passage in a parking lot.

The vehicle automatic parking control device 300 receives the road width information and the congestion information relating to the parking space from the navigation device 200, and determines the vehicle speed of the subject vehicle for parking assist by using the road width information, the congestion information, and the detected road width information.

To this end, the vehicle automatic parking control device 300 includes an information collection device 310, a parking space determination device 320, a control device 330, a vehicle speed determination device 340, a parking assist device 350, and a storage device 360.

The information collection device 310 is configured to collect the detected road width information, the road width information, and the congestion information.

The parking space determination device 320 is configured to determine, by using the detected road width information and the road width information, whether a turning radius for the parking is sufficient and determines a congestion degree relating to the parking space by using the congestion information.

The control device 330 is configured to control the vehicle to enter a parking assist mode when the control device 330 receives a request for parking assist from a driver. The control device 330 activates relevant sensors of the sensor device 100 when the number of sensors to be activated by the vehicle speed determination device 340 is determined.

The vehicle speed determination device 340 is configured to determine the number of sensors which are to be activated among the collective sensors based on the turning radius for parking and the congestion degree relating to the parking space, thereby determining the vehicle speed required for parking. In the present case, the vehicle speed determination device 340 determines whether the turning area for the parking is ensured, by using the road width information acquired from map data of the navigation device 200 and the detected road width information by the sensor device 100. The vehicle speed determination device 340 determines the vehicle speed for the parking. In the present case, the vehicle speed determination device 340 determines a congestion degree relating to the parking space by using the congestion information received from the navigation device 200.

The vehicle speed determination device 340 determines a first vehicle speed, which is the maximum vehicle speed, by activating a first group including the minimum number of sensors (e.g., six ultrasonic sensors) among the sensors, when the road width information and the detected road width information are equal to or greater than a reference value, and when the congestion degree is low. In other words, when the congestion degree relating to the parking space is low and when there is an area sufficient for the vehicle to turn for parking, only the minimum number of sensors are activated wherein the detecting sampling rate of the sensors is minimized to assist parking at the maximum speed. Accordingly, parking may be finished at a rapid speed.

The vehicle speed determination device 340 may determine a second vehicle speed, which is slower than the first vehicle speed, by activating a second group, including sensors (e.g., eight ultrasonic sensors) more numerous than those of the first group, among the sensors for the parking assist when at least one of the road width information and the detected road width information is lower than the reference value, and when the congestion degree is low. In other words, when the congestion degree is low and when the road width is slightly narrow, the vehicle speed determination device 340 activates sensors larger than the minimum number of sensors in number among the sensors, wherein the sensors perform detecting operations. Accordingly, since the sensing sampling rate is slightly increased, the vehicle speed for the parking may be more reduced as compared to the maximum vehicle speed.

When the congestion degree is high, the vehicle speed determination device 340 determines a third vehicle speed, which is the lowest vehicle speed, lower than the first and second vehicle speeds by activating all sensors (i.e., 12 sensors) without conditions regardless of the road width information and the detected road width information. In other words, when the congestion degree is high, the parking assist may be performed at the lowest vehicle speed regardless of the road width while all sensors are being utilized.

The parking assist device 350 is configured to perform the parking assist based on the vehicle speed determined by the vehicle speed determination device 340.

The storage device 360 may store information on the vehicle speed and information on activated sensors therein.

Hereinafter, a method of determining a vehicle speed based on sensing sampling time will be described in detail with reference to FIG. 3A to FIG. 5C.

Figure 7A:
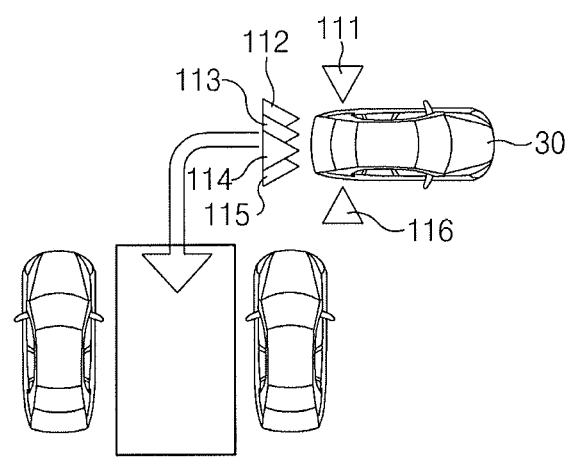
FIG. 7A is a view illustrating that six rear sensors are activated, according to an exemplary embodiment of the present invention.
Figure 7B:
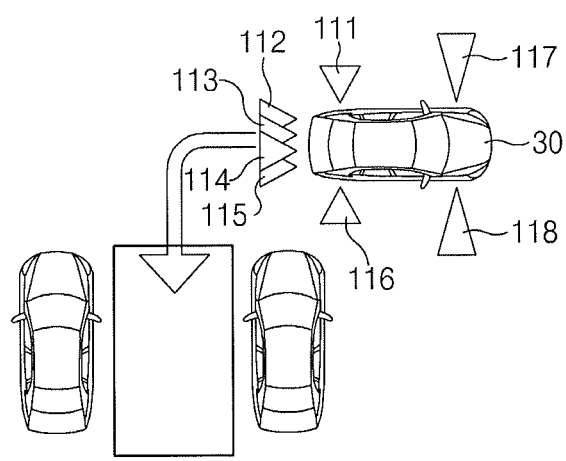
FIG. 7B is a view illustrating that six rear sensors and two front-side sensors are activated, according to an exemplary embodiment of the present invention.
Figure 7C:
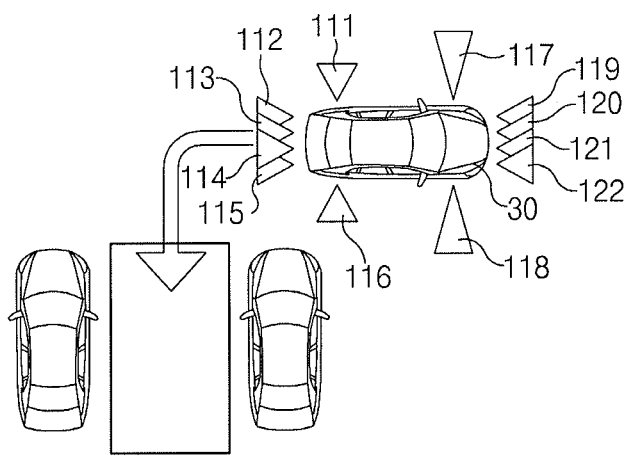
FIG. 7C is a view illustrating that all of 12 sensors are activated, according to an exemplary embodiment of the present invention.

The sensor device 100 may include 12 ultrasonic sensors, and may include front sensors 119, 120, 121, and 122, rear sensors 112, 113, 114, and 115, rear-side sensors 111 and 116, and front-side sensors 117 and 118 as illustrated in FIG. 7C. In the present case, the front sensors 119, 120, 121, 122, the rear sensors 112, 113, 114, and 115, and the rear-side sensors 111 and 116 are short-distance sensors having the detecting sampling rate of 30 ms. The front-side sensors 117 and 118 are long-distance sensors having the sampling rate of 100 ms.

In the present case, the ultrasonic sensor transmits detecting data based on local interconnect network (LIN) communication. The LIN has a simple configuration and is based on a low-speed, 12 V single-wire bus manner. The LIN transmits data in a master-slave manner. One master and a plurality of slaves sequentially share and process their tasks depending on data to be processed.

In other words, when one ultrasonic sensor detects a distance and transmits detecting data to the vehicle automatic parking control device 300, 11 remaining ultrasonic sensors do not transmit the detecting data, but have to stand by. Accordingly, as the number of slave ultrasonic-sensors is increased, one period (communication sampling time) is increased and thus the whole communication period is increased.

When the detecting is performed by using 10 short-distance sensors, each of which has the detecting sampling time of 30 ms and two long-distance sensors, each of which has the detecting sampling time of 100 ms, the whole detecting sampling time requires 500 ms in total.

The detecting range of the front and rear sensors may be up to 120 cm, the braking distance may be 50 cm in the case of the vehicle speed of 7 kph or less, and the remaining distance margin after stopping may be 41 cm.

Figure 3A:
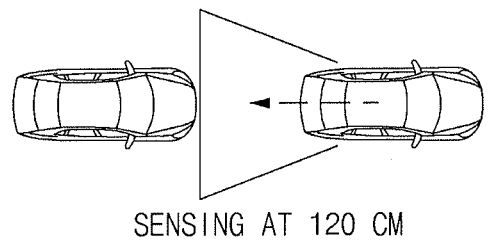
FIG. 3A is a view illustrating detecting at a distance of 120 cm, according to an exemplary embodiment of the present invention.
Figure 3B:
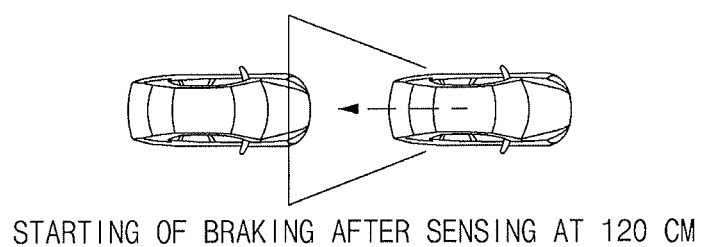
FIG. 3B is a view illustrating the start of braking after detecting at a distance of 91 cm, according to an exemplary embodiment of the present invention.
Figure 3C:
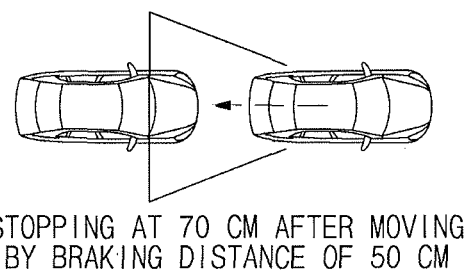
FIG. 3C is a view illustrating the stopping of a vehicle at a distance of 41 cm after moving by a braking distance of 50 cm, according to an exemplary embodiment of the present invention.

FIG. 3A is a view illustrating detecting at a distance of 120 cm according to an exemplary embodiment of the present invention. FIG. 3B is a view illustrating the start of braking after a detecting operation at a distance of 91 cm, according to an exemplary embodiment of the present invention. FIG. 3C is a view illustrating the stopping of a vehicle at a distance of 41 cm after moving by a braking distance of 50 cm, according to an exemplary embodiment of the present invention.

Referring to FIG. 3A, when the subject vehicle stops as the rear sensors detect a rear vehicle based on the detecting sampling time at the distance of 120 cm between the subject vehicle and the rear vehicle, the subject vehicle stops after moving the braking distance of 50 cm as illustrated in FIG. 3B. Accordingly, 120 cm−50 cm=70 cm, which becomes the distance between the subject vehicle and the rear vehicle as illustrated in FIG. 3C.

In the present case, the driving distance per sample may be determined as expressed in Equation 1.

Driving distance (m) per sample=vehicle speed (mps)*detecting sampling time (s).      Equation 1

In the present case, to change the unit of a vehicle speed from kph to mps, the vehicle speed in the unit of kph may be divided by 3.6 kph. For example, when a parking control speed is adjusted to 3 kph, the driving distance per sample becomes about 42 cm since 3 kph/3.6 kph (mps)*0.5 sec.=approximately 42 cm.

Figure 4A:
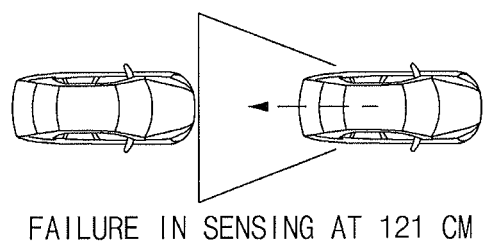
FIG. 4A is a view illustrating the failure in detecting at a distance of 121 cm, according to an exemplary embodiment of the present invention.
Figure 4B:
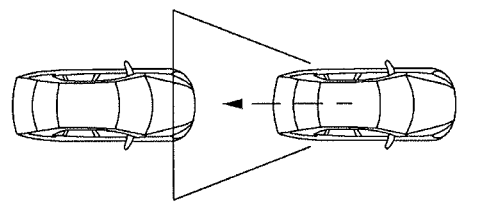
FIG. 4B is a view illustrating detecting at a distance of 79 cm after moving during one sample section, according to an exemplary embodiment of the present invention.
Figure 4C:
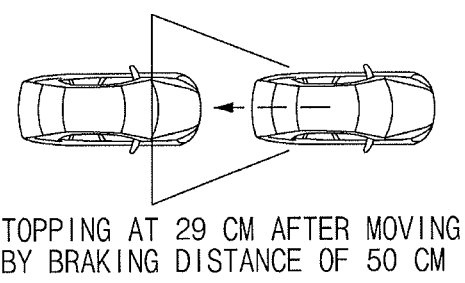
FIG. 4C is a view illustrating the stopping of a vehicle at a distance of 29 cm after moving by a braking distance of 50 cm, according to an exemplary embodiment of the present invention.

FIG. 4A is a view illustrating a failure in detecting at a distance of 121 cm according to an exemplary embodiment of the present invention. FIG. 4B is a view illustrating detecting at a distance of 79 cm after moving during one sample section, according to an exemplary embodiment of the present invention. FIG. 4C is a view illustrating the stopping of a vehicle at a distance of 29 cm after moving by a braking distance of 50 cm, according to an exemplary embodiment of the present invention.

Referring to FIG. 4A, the rear sensor starts detecting based on the detecting sampling time (0.5 sec.) at the distance of 121 cm between the subject vehicle and the rear vehicle. In the present case, since the maximum detecting range of the rear sensor is 120 cm, the rear sensor does not detect the rear vehicle at the distance of 121 cm. Accordingly, when the subject vehicle moves backward by the distance of 42 cm during the detecting sampling time as illustrated in FIG. 4B, the rear sensor detects the rear vehicle at the distance of 79 cm (121 cm−42 cm). Then, when the subject vehicle starts braking at the distance of 79 cm as illustrated in FIG. 4C, and when the subject vehicle moves by the braking distance of 50 cm, since the distance from the rear vehicle becomes 29 cm (79 cm−50 cm), the distance between the subject vehicle and the rear vehicle becomes 29 cm after the braking is finished. This means that 41 cm, which is the remaining distance margin after stopping, is not ensured and thus vehicle collision may occur. In other words, when the vehicle speed is adjusted to a value greater than 3 kph, the probability, in which the vehicle collision occurs, is increased.

Therefore, according to an exemplary embodiment of the present invention, to reduce the detecting sampling time, only the rear sensors 112, 113, 114, and 115 and the rear-side sensors 111 and 116 are activated and operated as illustrated in FIG. 7A. In the present case, the detecting sampling time becomes 180 ms since 6*30 ms=180 ms.

The detecting range of the front and rear sensors is up to 120 cm, the braking distance is 50 cm in the case of the vehicle speed of 7 kph or less, and the remaining distance margin after the stopping may be 30 cm. In the present case, when the parking control speed is 6 kph, the driving distance per sample becomes about 30 cm since 6 kph/3.6 kph (mps)*0.18 s=approximately 30 cm.

Figure 5A:
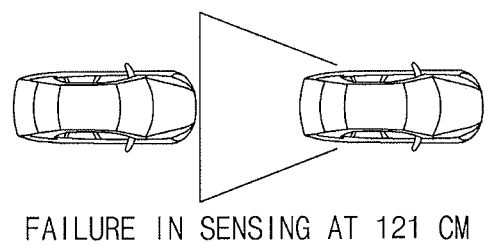
FIG. 5A is a view illustrating the failure in detecting at a distance of 121 cm, according to an exemplary embodiment of the present invention.
Figure 5B:
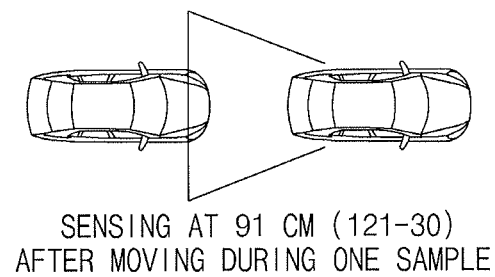
FIG. 5B is a view illustrating detecting at a distance of 91 cm after moving one sample section, according to an exemplary embodiment of the present invention.
Figure 5C:
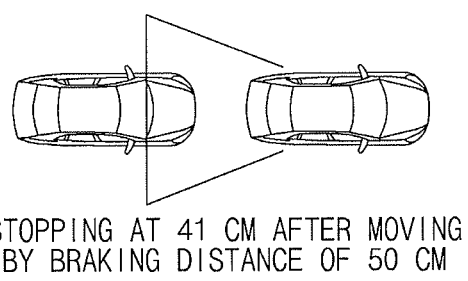
FIG. 5C is a view illustrating the stopping of the vehicle at a distance of 41 cm after moving a braking distance of 50 cm, according to an exemplary embodiment of the present invention.

FIG. 5A is a view illustrating the failure in detecting at a distance of 121 cm, according to an exemplary embodiment of the present invention. FIG. 5B is a view illustrating detecting at a distance of 91 cm after moving one sample section, according to an exemplary embodiment of the present invention. FIG. 5C is a view illustrating the stopping of the vehicle at a distance of 41 cm after moving a braking distance of 50 cm, according to an exemplary embodiment of the present invention.

Referring to FIG. 5A, the rear sensor does not detect the rear vehicle at the distance of 121 cm between the subject vehicle and the rear vehicle, and the subject vehicle moves backward by a distance of 30 cm during one detecting sampling time. In the present case, 121 cm−30 cm=91 cm, and the rear sensor detects the rear vehicle at the distance of 91 cm as illustrated in FIG. 5B. Then, when the subject vehicle starts braking at the distance of 91 cm, the subject vehicle moves backward by the braking distance of 50 cm and stops at the distance of 41 cm from the rear vehicle as illustrated in FIG. 5C. Accordingly, in the case of the vehicle speed of up to 6 kph, the margin distance of 41 cm may be ensured and thus the subject vehicle may be safely stopped.

Figure 6:
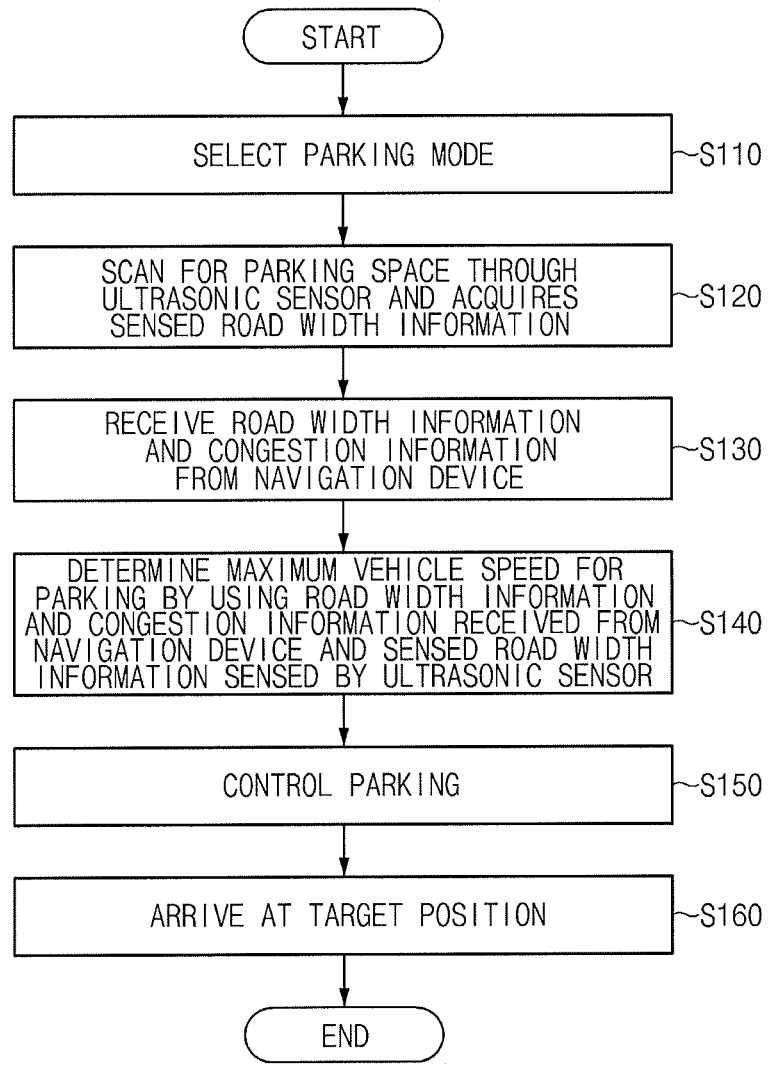
FIG. 6 is a flowchart illustrating a method of controlling automatic parking of a vehicle, according to an exemplary embodiment of the present invention.

Hereinafter, a method of controlling automatic parking of a vehicle according to an exemplary embodiment of the present invention will be described in detail with reference to FIG. 6, Table 1, FIG. 7A, FIG. 7B, and FIG. 7C.

First, the vehicle automatic parking control device 300 enters a parking mode in response to a user request (S110). The vehicle automatic parking control device 300 scans for a parking space through an ultrasonic sensor and acquires detected road width information (S120). In the present case, the parking mode serves as the parking assist mode and includes a perpendicular parking (right and left) mode, a parallel parking (right and left) mode, and a parallel parking out mode to be selected.

Subsequently, the vehicle automatic parking control device 300 receives road width information and congestion information from the navigation device 200 (S130).

The vehicle automatic parking control device 300 determines the maximum vehicle speed for parking by using the road width information and the congestion information received from the navigation device 200 and the detected road width information by the ultrasonic sensor (S140).

The following Table 1 shows an example of determining the number of sensors to be activated and a vehicle speed based on the road width information, the detected road width information, and the congestion information. FIG. 7A is a view illustrating that six rear sensors are activated, according to an exemplary embodiment of the present invention. FIG. 7B is a view illustrating that six rear sensors and two front-side sensors are activated, according to an exemplary embodiment of the present invention. FIG. 7C is a view illustrating that all of 12 sensors are activated, according to an exemplary embodiment of the present invention.

The driving distance per sample may be determined through Equation 1. To change the unit of the vehicle speed from kph to mph, the driving distance is multiplied by 3.6. As described above, when the turning radius for parking is sufficient and the congestion degree is low, only a minimum number of sensors are activated wherein the detecting sampling time is minimized. Accordingly, parking is performed at a high vehicle speed and thus rapidly finished.

Meanwhile, the vehicle automatic parking control device 300 determines the turning radius for parking in the parking space as being insufficient when at least one of the road width information received from the navigation device 200 and the detected road width information by the ultrasonic sensor is less than the reference value. In the present case, even when the congestion degree is low, and when the turning radius for parking in the parking space is insufficient, six rear sensors and two front-side sensors are activated. Accordingly, the detecting sampling time is determined as the sum of 6*30 ms(=180 ms) and 2*100 ms(=200 ms) and thus becomes 380 ms in total.

Therefore, the vehicle speed is 2.84 kph since V=(3.6*0.3)/0.38=2.84 kph. As described above, when the congestion degree is low and the turning radius for the parking is insufficient, eight sensors are selected and activated wherein the detecting sampling is slightly increased as illustrated in FIG. 7B. Accordingly, the vehicle speed may be decreased.

In addition, when the vehicle automatic parking control device 300 determines the congestion degree as being high based on the congestion information received from the

TABLE 1

| Road width information | Reference value or more | Reference value or more | Less than reference value | Reference value or more | Reference value or more | Less than reference value |
|---|---|---|---|---|---|---|
| Detected road width information | Reference value or more | Less than reference value | Reference value or more | Reference value or more | Less than reference value | Reference value or more |
| Congestion degree | Low | Low | Low | High | High | High |
| Number of activated sensors | Six rear sensors | Six rear sensors and two front-side sensors | Six rear sensors and two front-side sensors | All of 12 sensors | All of 12 sensors | All of 12 sensors |
| Sensing sampling time | 6 * 30 ms = 180 ms | 6 * 30 ms = 180 ms, 2 * 100 ms = 200 ms -> 380 ms in total | 6 * 30 ms = 180 ms, 2 * 100 ms = 200 ms -> 380 ms in total | 10 * 30 ms = 300 ms, 2 * 100 ms = 200 ms ->500 ms in total | 10 * 30 ms = 300 ms, 2 * 100 ms = 200 ms ->500 ms in total | 10 * 30 ms = 300 ms, 2 * 100 ms = 200 ms ->500 ms in total |
| Vehicle speed | V = (3.6 * 0.3)/ 0.18 = 6 kph | V = (3.6 * 0.3)/ 0.38 = 2.84 kph | V = (3.6 * 0.3)/0.38 = 2.84 kph | V = (3.6 * 0.3)/0.5 = 2.16 kph | V = (3.6 * 0.3)/0.5 = 2.16 kph | V = (3.6 * 0.3)/ 0.5 = 2.16 kph |

The vehicle automatic parking control device 300 determines the turning radius for parking as being sufficient since the road width information received from the navigation device 200 or the detected road width information by the ultrasonic sensor exceed a reference value. In the case of the low congestion degree, only six sensors 111 to 115 are activated among the 12 sensors and the detecting sampling time becomes 180 ms since 6*30 ms=180 ms. Accordingly, the vehicle speed may be determined as expressed in Equation 2.

Vehicle speed (kph)=driving distance per sample/
detecting sampling time   Equation 2

Accordingly, the vehicle speed becomes 6 kph since V=(3.6*0.3)/0.18=6 kph.

navigation device 200, the vehicle automatic parking control device 300 determines a present situation as being a situation of requiring careful driving regardless of the road width information or the detected road width information. Thus, the vehicle automatic parking control device 300 activates all of 12 sensors as illustrated in FIG. 7C.

The detecting sampling time becomes 500 ms which is the sum of 10*30 ms (300 ms in the case of 10 short-distance sensors) and 2*100 ms (200 ms in the case of two long-distance sensors). In addition, the vehicle speed=2.16 kph since V=(3.6*0.3)/0.5=2.16 kph.

In other words, when the congestion degree is high, since the parking must be safely performed regardless of the road width information, the vehicle speed is determined to be lowest vehicle speed as much as possible. Accordingly, even when a time is prolonged, the parking assist may be safely performed.

The vehicle automatic parking control device 300 assists the parking control based on the determined vehicle speed (S150).

The vehicle automatic parking control device 300 terminates the parking assist when a vehicle arrives at a target position for the parking (S160).

As described above, according to an exemplary embodiment of the present invention, the activation of the sensors is controlled and the vehicle speed of the subject vehicle is determined, by utilizing all of the road width information and the congestion information of the navigation device and the detected road width information by the ultrasonic sensor of the subject vehicle. Accordingly, power consumption may be minimized and the parking may be rapidly and safely controlled.

Figure 8:
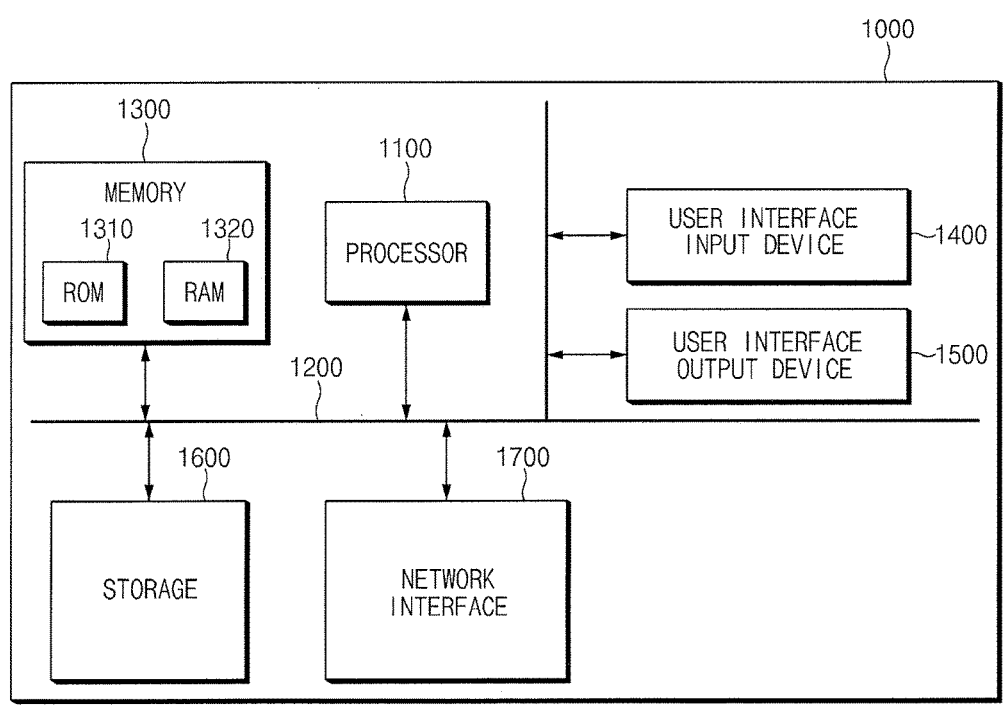
FIG. 8 is a block diagram illustrating a computer system, to which the method of controlling the automatic parking of the vehicle is applied, according to an exemplary embodiment of the present invention.

FIG. 8 is a block diagram illustrating a computer system, to which the method of controlling the automatic parking of the vehicle is applied, according to an exemplary embodiment of the present invention.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device which processes instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection to the embodiments of the present invention in the specification may be directly implemented with a hardware module, a software module, or combinations thereof, executed by the processor 1100. The software module may reside on a storage medium (i.e., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the integrated processor and storage medium may reside as a separate component of the user terminal.

According to an exemplary embodiment of the present invention, a sensor mode and an operating sensor are controlled during the parking control, by utilizing information on a passage and information on a congestion degree of a parking lot, which is acquired from the navigation device. Accordingly, power consumption may be minimized and the automatic parking control may be rapidly and safely performed.

For convenience in explanation and accurate definition in the appended claims, the terms "upper", "lower", "inner", "outer", "up", "down", "upwards", "downwards", "front", "back", "rear", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling automatic parking of a vehicle, the system comprising:
   a navigation device configured to store road width information and congestion information relating to a parking space, wherein the congestion information includes a congestion degree;
   a sensor device configured to scan for the parking space and to acquire detected road width information, when entrance to a parking mode is made; and
   a vehicle automatic parking control device coupled to the navigation device and the sensor device and configured to receive the road width information and the congestion information relating to the parking space from the navigation device and to determine a vehicle speed of a subject vehicle for parking assist by using the road width information and the congestion information received from the navigation device, and the detected road width information received from the sensor device,
   wherein the vehicle automatic parking control device is configured for:
      activating a first group including a minimum number of sensors selected among the plurality of sensors of the sensor device, when the road width information and the detected road width information are equal to or greater than a reference value, and when the congestion degree is lower than a predetermined value;
      activating a second group including sensors, which are larger than the sensors of the first group in number and are selected among the sensors for the parking assist, when at least one of the road width information and the detected road width information is lower than the reference value, and when the congestion degree is lower than the predetermined value;
      activating a third group including an entire portion of the sensors for the parking assist, when the congestion degree is higher than the predetermined value; and
      determining the vehicle speed using driving distance per sample and detecting sampling time by the activated group.

2. The system of claim 1, wherein the sensor device includes:
   at least a plurality of ultrasonic sensors, a plurality of cameras, or a plurality of scanners.

3. The system of claim 1, wherein the sensor device includes:
   a plurality of sensors disposed at a front portion, a rear portion, and opposite side portions of the vehicle.

4. The system of claim 3, wherein the vehicle automatic parking control device includes:
- an information collection device configured to collect the detected road width information, the road width information, and the congestion information; and
- a parking space determination device configured to determine, by using the detected road width information and the road width information, whether a turning radius for the parking is sufficient and to determine congestion degree relating to the parking space by using the congestion information; and
- a vehicle speed determination device configured to determine a vehicle speed for the parking based on the turning radius for the parking and the congestion degree relating to the parking space.

5. The system of claim 4, further comprising:
- a parking assist device configured to perform the parking assist based on the vehicle speed determined by the vehicle speed determination device.

6. The system of claim 4, wherein the vehicle speed determination unit determines a first vehicle speed by activating the first group including a minimum number of sensors selected among the plurality of sensors, when the road width information and the detected road width information are equal to or greater than a reference value, and when the congestion degree is lower than the predetermined value.

7. The system of claim 6, wherein the vehicle speed determination device determines the vehicle speed as the first vehicle speed which is a maximum vehicle speed.

8. The system of claim 6, wherein the vehicle speed determination device determines a second vehicle speed by activating the second group including sensors, which are larger than the sensors of the first group in number and are selected among the sensors for the parking assist, when at least one of the road width information and the detected road width information is lower than the reference value, and when the congestion degree is lower than the predetermined value.

9. The system of claim 8, wherein the vehicle speed determination device determines a third vehicle speed by activating the third group including an entire portion of the sensors for the parking assist, when the congestion degree is higher than the predetermined value.

10. The system of claim 9, wherein the second vehicle speed is lower than the first vehicle speed, and the third vehicle speed is lower than the second vehicle speed.

11. An apparatus for controlling automatic parking of a vehicle, the apparatus comprising:
- an information collection device coupled to a sensor device and a navigation device and configured to collect detected road width information relating to a parking space from the sensor device and to collect road width information and congestion information relating to the parking space from the navigation device;
- a parking space determination device configured to determine, by using the detected road width information and the road width information received from the information collection device, whether a turning radius for the parking is sufficient and to determine a congestion degree relating to the parking space by using the congestion information received from the information collection device;
- a vehicle speed determination device configured to determine a vehicle speed for the parking based on the turning radius for the parking and the congestion degree relating to the parking space wherein the congestion degree is received from the parking space determination device; and
- a parking assist device configured to perform parking assist based on the vehicle speed determined by the vehicle speed determination device,
- wherein the vehicle speed determination unit is configured for:
  - activating a first group including a minimum number of sensors selected among the plurality of sensors of the sensor device, when the road width information and the detected road width information are equal to or greater than a reference value, and when the congestion degree is lower than a predetermined value;
  - activating a second group including sensors, which are larger than the sensors of the first group in number and are selected among the sensors for the parking assist, when at least one of the road width information and the detected road width information is lower than the reference value, and when the congestion degree is lower than the predetermined value;
  - activating a third group including an entire portion of the sensors for the parking assist, when the congestion degree is higher than the predetermined value; and
  - determining the vehicle speed using driving distance per sample and detecting sampling time by the activated group.

12. A method of controlling automatic parking, the method comprising:
- scanning for a parking space and acquiring detected road width information, when entrance to a parking mode is made;
- acquiring road width information and congestion information relating to the parking space from a navigation device; and
- determining, by a controller, a vehicle speed of a subject vehicle for parking assist by using the road width information and the congestion information, and the detected road width information,
- wherein the step of determining a vehicle speed of a subject vehicle includes;
  - activating a first group including a minimum number of sensors selected among the plurality of sensors of a sensor device, when the road width information and the detected road width information are equal to or greater than a reference value, and when the congestion degree is lower than the predetermined value;
  - activating a second group including sensors, which are larger than the sensors of the first group in number and are selected among the sensors for the parking assist, when at least one of the road width information and the detected road width information is lower than the reference value, and when the congestion degree is lower than the predetermined value;
  - activating a third group including an entire portion of the sensors for the parking assist, when the congestion degree is higher than the predetermined value; and
  - determining the vehicle speed using driving distance per sample and detecting sampling time by the activated group.

13. The method of claim 12, wherein the determining of the vehicle speed of the subject vehicle includes:

determining whether a turning space for the parking is ensured by using the road width information, and the detected road width information; and determining the congestion degree relating to the parking space using the congestion information.

14. The method of claim 13, wherein the determining of the vehicle speed of the subject vehicle includes:

determining a first vehicle speed by activating the first group including a minimum number of sensors selected among a plurality of sensors for the parking assist, when the road width information and the detected road width information are equal to or greater than a reference value, and when the congestion degree is lower than the predetermined value.

15. The method of claim 14, wherein the determining of the vehicle speed of the subject vehicle further includes:

determining the vehicle speed as the first vehicle speed which is a maximum vehicle speed.

16. The method of claim 14, wherein the determining of the vehicle speed of the subject vehicle further includes:

determining a second vehicle speed by activating the second group including sensors, which are larger than the sensors of the first group in number and are selected among the sensors for the parking assist, when at least one of the road width information and the detected road width information is lower than the reference value, and when the congestion degree is lower than the predetermined value.

17. The method of claim 16, wherein the determining of the vehicle speed of the subject vehicle further includes:

determining a third vehicle speed by activating the third group including an entire portion of the sensors for the parking assist, when the congestion degree is higher than the predetermined value.

18. The method of claim 17, wherein the second vehicle speed is lower than the first vehicle speed, and the third vehicle speed is lower than the second vehicle speed.

19. The method of claim 12, further comprising:

assisting the parking based on the determined vehicle speed.

20. The method of claim 12, wherein the acquiring of the road width information and the congestion information relating to the parking space includes:

receiving the road width information and the congestion information from the navigation device.

* * * * *